United States Patent
Nair et al.

(10) Patent No.: US 12,330,597 B2
(45) Date of Patent: Jun. 17, 2025

(54) PIVOT ASSEMBLY FOR A WIPER SYSTEM

(71) Applicant: VALEO SYSTEMES D'ESSUYAGE, La Verriere (FR)

(72) Inventors: Sajeev Nair, Auburn Hills, MI (US); Jagadeeswaran Vasudevan, Chennai (IN); Eduardo Ribeiro, Auburn Hills, MI (US)

(73) Assignee: VALEO SYSTEMES D'ESSUYAGE, La Verriere (FR)

( * ) Notice: Subject to any disclaimer, the term of this patent is extended or adjusted under 35 U.S.C. 154(b) by 0 days.

(21) Appl. No.: 18/486,257

(22) Filed: Oct. 13, 2023

(65) Prior Publication Data

US 2025/0121798 A1    Apr. 17, 2025

(51) Int. Cl.
*B60S 1/04* (2006.01)
*B60S 1/24* (2006.01)
(Continued)

(52) U.S. Cl.
CPC .......... *B60S 1/0491* (2013.01); *B60S 1/0441* (2013.01); *B60S 1/3493* (2013.01); *F16J 15/50* (2013.01); *B60S 1/24* (2013.01); *B60S 1/245* (2013.01)

(58) Field of Classification Search
CPC .... B60S 1/0491; B60S 1/0425; B60S 1/0433; B60S 1/24; B60S 1/0405; B60S 1/0436;
(Continued)

(56) References Cited

U.S. PATENT DOCUMENTS 3,790,985 A    2/1974  Kessler
6,318,735 B1 *  11/2001  Lambeth ................ B60S 1/349
                                                                  15/250.31
(Continued)

FOREIGN PATENT DOCUMENTS

CN    211765417 U    10/2020
DE    19918873 A1 *  10/1999  ............ B60S 1/0488
(Continued)

OTHER PUBLICATIONS

Machine translation of description portion of Japanese publication 2005-324710, published Nov. 2005. (Year: 2005).*
(Continued)

*Primary Examiner* — Gary K. Graham
(74) *Attorney, Agent, or Firm* — Valeo Systemes d'Essuyage (57) ABSTRACT

The present invention relates to a pivot assembly for a vehicle wiper system. The assembly includes a pivot shaft rotatably supported in central passage of a pivot housing, a lever coupled to the pivot shaft, and a cover. The cover includes a tubular portion, cylindrical step and a transition portion integrally formed between the tubular portion and the cylindrical step. The cover further includes a cantilever snap extending from inner surface of the transition portion, in longitudinal direction of the cover. A protrusion is formed in the cylindrical step at a location adjacent to the snap. The tubular portion of the cover is received over pivot shaft and a locking profile formed at free end of the snap is received in a recess formed in top end of the pivot housing, thereby restricting longitudinal and rotational movements of the cover with respect to the pivot housing.

6 Claims, 8 Drawing Sheets

(51) Int. Cl.
*B60S 1/34* (2006.01)
*F16J 15/50* (2006.01)

(58) Field of Classification Search
CPC ...... B60S 1/245; B60S 1/0441; B60S 1/0416; B60S 1/3493; F16J 15/50
USPC ......... 15/250.3, 250.31, 250.34; 403/DIG. 3, 403/DIG. 4; 384/489
See application file for complete search history.

(56) References Cited

U.S. PATENT DOCUMENTS

| | | | | |
|---|---|---|---|---|
| 6,594,853 | B1* | 7/2003 | Igarashi | B60S 1/34 15/250.31 |
| 7,222,386 | B2 | 5/2007 | Nakamura | |
| 8,156,604 | B2* | 4/2012 | Kraus | B60S 1/0488 29/445 |
| 8,448,289 | B2* | 5/2013 | Reith | B60S 1/06 15/250.31 |
| 10,239,497 | B2 | 3/2019 | Yamamoto | |
| 10,723,319 | B2 | 7/2020 | Okamoto | |
| 10,780,862 | B2 | 9/2020 | Hasegawa | |
| 2006/0053577 | A1* | 3/2006 | Moein | B60S 1/0814 310/67 R |
| 2011/0072608 | A1 | 3/2011 | Bohn et al. | |
| 2017/0355351 | A1 | 12/2017 | Cebula et al. | |

FOREIGN PATENT DOCUMENTS

| | | | | |
|---|---|---|---|---|
| DE | 102008001937 | A | | 11/2009 |
| EP | 3242819 | B1 | | 1/2019 |
| JP | 2000071941 | A | * | 3/2000 |
| JP | 2005324710 | A | * | 11/2005 ............ B60S 1/3493 |
| JP | 2009190698 | A | | 8/2009 |
| JP | 2011105098 | A | | 6/2011 |
| JP | 2015110362 | A | | 6/2015 |
| JP | 2019182043 | A | | 10/2019 |
| JP | 2021181287 | A | | 11/2021 |

OTHER PUBLICATIONS

European Patent Office, International search report and written opinion regarding the International application No. PCT/US2024/050349 dated Jan. 14, 2025.

* cited by examiner

PIVOT ASSEMBLY FOR A WIPER SYSTEM

TECHNICAL FIELD

The present invention relates to a wiper system for cleaning a vehicle window, and more particularly to a pivot assembly including a rain cover, for a vehicle wiper system.

Generally, a vehicle includes a windshield provided in the front of the vehicle to provide proper visibility to the diver and at the same time to separate the vehicle interior space from outside. The windshield also protects the occupants from elements like wind, rain and likewise. However, accumulation of water, dirt, dust etc. on the windshield obstructs the vision of the driver and may become cause of fatal accident. Therefore, a wiper system is provided to wipe out any dirt and water from the windshield. Similarly, the wiper systems may be provided for rear windshield as well as for the door windows as per the requirement.

BACKGROUND OF THE INVENTION

The wiper system traditionally consists of a wiper arm, one end of which is connected to an output shaft of a wiper motor through linkages and a wiper blade is attached to another end of the wiper arm. The wiper motor drives the wiper arm to swing between the predefined angular positions to wipe out the water and dirt present on the windshield.

The wiper system further includes a pivot assembly having a pivot shaft that is securely engaged with the wiper arm at one end and another end of the pivot shaft is fixedly connected to a lever. When wiping function is turned on, the wiper motor rotates the pivot shaft back and forth, through linkages connected to the lever. A cowl panel is provided near the bottom end of the windshield, which covers the linkages along with the wiper motor and some portion of the pivot assembly such as the top end of the pivot shaft extends outside from a pivot hole provided in the cowl panel.

During rain or like environmental conditions, the pivot assembly may be exposed to water, dirt, etc., and flooding may affect the working of pivot assembly leading to abnormal noise. There is a risk of water interacting with grease and thereby damaging bearings of pivot assembly.

Rain caps/covers are generally used to prevent this flooding situation by covering the pivot shaft in a sealed manner. However, conventional rain caps are fixed to the pivot shaft and therefore rotates along with the pivot shaft with respect to the pivot housing. This may lead to removal of rain cap from pivot assembly even with minimum force. As various forces will act on the pivot assembly during transit as well as while using vehicle on roads, the rain cap may fall off from its place very easily. This will expose the pivot assembly to aforementioned weather conditions

SUMMARY OF THE INVENTION

An object of the present invention is to solve the disadvantages described above of known pivot assemblies. In particular, the object of the present invention is to provide a cover for the pivot shaft of the pivot assembly.

Another object of the present invention is to provide a cost effective cover having a simpler design, for the prevention of ingress of water and/or dirt or any other foreign materials, in the pivot assembly.

In this context, present invention is directed towards a cover for a pivot assembly of wiper system. The cover includes a tubular portion, a cylindrical step, a transition portion integrally formed between the tubular portion and the cylindrical step, and at least one cantilever snap configured to extend from inner surface of the transition portion, in longitudinal direction of the cover.

In a non-limiting embodiment of the present invention, the diameter of the cylindrical step is greater than the diameter of the tubular portion.

In a non-limiting embodiment of the present invention, the cantilever snap is configured with a locking profile formed at its free end.

In a non-limiting embodiment of the present invention, the cylindrical step includes at least one protrusion extending radially outward, formed at a location adjacent to the cantilever snap, to provide a predefined clearance between inner surface of the cylindrical step and the cantilever snap.

In a non-limiting embodiment of the present invention, the tubular portion has conical shape with diameter decreasing towards its free end.

In an alternate embodiment, two or more cantilever snaps are provided at predefined locations on the inner surface of the transition portion.

The present invention also relates to a pivot assembly for a wiper system including a pivot housing, a pivot shaft configured to be coupled to a wiper arm, a washer configured to rest on top edge of the pivot housing, and a cover configured to be received over a portion of the pivot shaft extending out from the pivot housing. At least a portion of the pivot shaft is rotatably supported in a central passage of the pivot housing. The washer is constrained in its position by a circlip engaged in a circlip groove provided in the pivot shaft. The cover includes a cantilever snap for locking the cover on the pivot housing.

In a non-limiting embodiment of the present invention, the pivot housing includes a housing body having a top end and a bottom end.

In a non-limiting embodiment of the present invention, the pivot housing further includes a recess formed at the top end of the housing body. The recess can be cut at a predefined position on the top end, using any suitable machining process.

In a non-limiting embodiment of the present invention, the recess has openings in top edge of the top end and outer surface of the housing body.

In a non-limiting embodiment of the present invention, the washer is configured to cover the opening of the recess in top edge of the top end.

In a non-limiting embodiment of the present invention, the cover includes a tubular portion, a cylindrical step and a transition portion integrally formed between the tubular portion and the cylindrical step. The tubular portion of the cover may be of cylindrical shape or may be of a conical shape with diameter decreasing towards its free end. A predefined clearance may be maintained between the diameter of the tubular portion and that of the pivot shaft.

In a non-limiting embodiment of the present invention, diameter of the cylindrical step is greater than the diameter of the tubular portion.

In a non-limiting embodiment of the present invention, the cantilever snap is configured to extend from inner surface of the transition portion, in longitudinal direction of the cover. Therefore, the cantilever snap may be generally parallel to the wall of the cylindrical step.

In a non-limiting embodiment of the present invention, the cantilever snap is configured with a locking profile formed at its free end. The locking profile may include angular surfaces as per the requirement.

In a non-limiting embodiment of the present invention, the cylindrical step includes a protrusion extending radially outward, formed at a location adjacent to the cantilever snap, to provide a predefined clearance between inner surface of the cylindrical step and the cantilever snap.

In a non-limiting embodiment of the present invention, the tubular portion of the cover is configured to be received over at least a portion of the pivot shaft extending out from a top end of the pivot housing.

In a non-limiting embodiment of the present invention, the locking profile of the cantilever snap is configured to cooperate with the washer for deforming the cantilever snap outwards during mounting of the cover on the pivot housing.

In a non-limiting embodiment of the present invention, the locking profile of the cantilever snap is configured to be received in the recess thereby locking the cover on the pivot housing.

In a non-limiting embodiment of the present invention, one or more bearings are provided between the portion of pivot shaft inserted in the central passage and the inner surface of the central passage.

The present invention also relates to a wiper system for a motor vehicle including a wiper arm, a pivot shaft configured to be coupled at one end of the wiper arm, a pivot housing configured to rotatably support at least a portion of the pivot shaft, a lever configured to be coupled at a lower end of the pivot shaft, a wiper motor configured to actuate the lever through mechanical linkages and a cover configured to be received over a portion of the pivot shaft and locked on the pivot housing. The cover includes a tubular portion, a cylindrical step, and a transition portion integrally formed between the tubular portion and the cylindrical step. The cover further includes a cantilever snap extending from inner surface of the transition portion, in longitudinal direction of the cover.

In a non-limiting embodiment of the present invention, the cantilever snap includes a locking profile formed at its free end.

In a non-limiting embodiment of the present invention, the locking profile is configured to be received in a recess formed in a top end of the pivot housing, upon mounting the cover on the pivot assembly.

In a non-limiting embodiment of the present invention, the cylindrical step includes a protrusion extending radially outward, formed at a location adjacent to the cantilever snap, to provide a predefined clearance between inner surface of the cylindrical step and the cantilever snap.

In a non-limiting embodiment of the present invention, diameter of the cylindrical step is greater than diameter of the tubular portion.

In a non-limiting embodiment of the present invention, the pivot housing is configured to be mounted on a vehicle structure.

The invention concerns also a vehicle including a window and at least a wiper system including a pivot assembly according to above embodiments.

BRIEF DESCRIPTION OF DRAWINGS

Other characteristics, details and advantages of the invention will become clearer on reading the following description, on the one hand, and several examples of realization given as an indication and without limitation with reference to the schematic drawings annexed, on the other hand, on which.

DETAILED DESCRIPTION OF THE INVENTION

The characteristics, variants and different modes of realization of the invention may be associated with each other in various combinations, in so far as they are not incompatible or exclusive with each other. In particular, variants of the invention comprising only a selection of features subsequently described in from the other features described may be imagined, if this selection of features is enough to confer a technical advantage and/or to differentiate the invention from prior art.

In the following description, the designations "top", "upper", "bottom", "lower", "radial" and "longitudinal" refer to the orientation of the pivot assembly when assembled on the vehicle. The "top end" and "upper end" corresponds to the end facing in upward direction. The "bottom end" and "lower end" corresponds to the end facing downward direction. Further, the "longitudinal direction" corresponds to the direction along axes of the cover, pivot shaft and/or the housing body of the pivot housing. The "radially outward" corresponds to the direction perpendicular to the longitudinal axis, along the radius and moving away from the axis.

Figure 1:
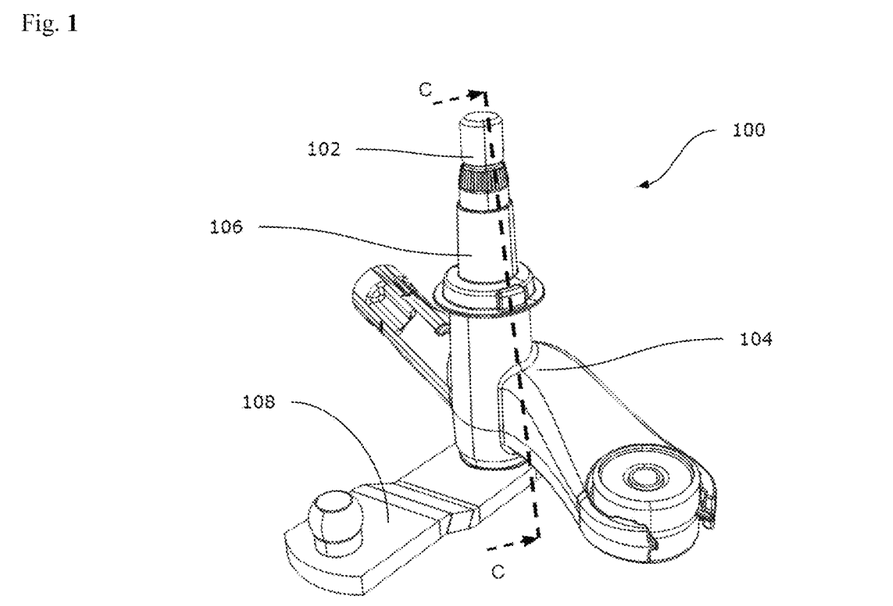
FIG. 1 illustrates a perspective view of pivot assembly, according to an embodiment of present invention.

As illustrated in FIG. 1, a pivot assembly 100 for a vehicle wiper system includes a pivot shaft 102 rotatably supported in a pivot housing 104. A wiper arm (not shown) is coupled at upper end of the pivot shaft 102. Further, a lever 108 is coupled at lower end of the pivot shaft 102. The lever 108 is driven by a wiper motor through suitable linkages to rotate the pivot shaft 102, in turn pivoting the wiper arm of the wiper system. A cover 106 is mounted on the pivot shaft 102 and locked on the pivot housing 104.

The pivot housing 104 may have a mounting leg and other similar provisions for mounting the wiper assembly on the vehicle and/or for connecting one pivot assembly with the other.

Figure 2A:
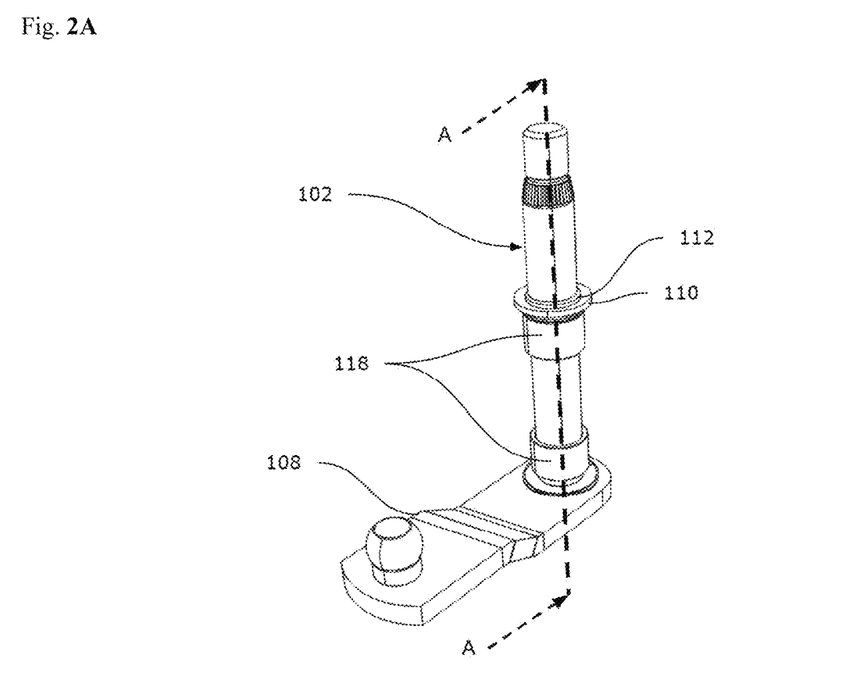
FIG. 2A illustrates a perspective view of pivot assembly by elimination pivot housing and cover, according to an embodiment of present invention.
Figure 2B:
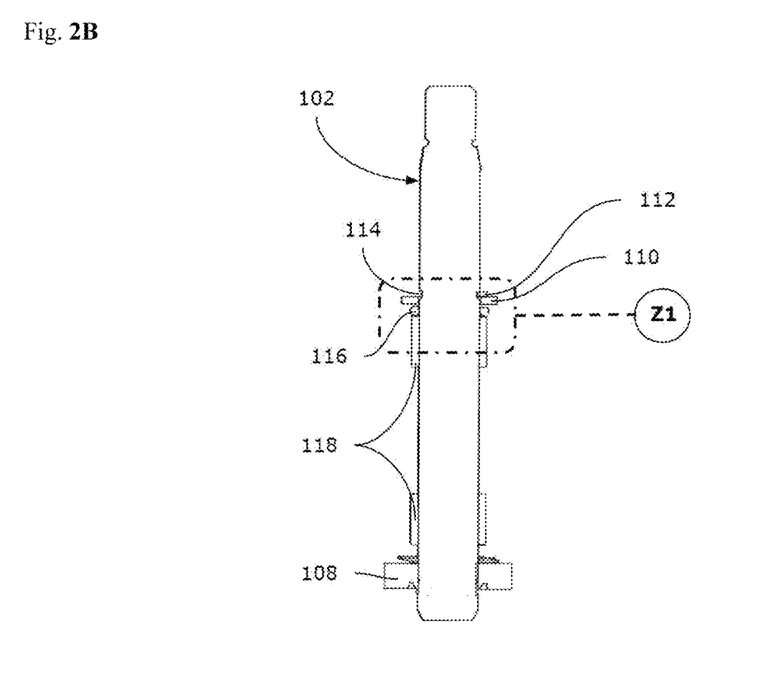
FIG. 2B illustrates a cross-sectional view of pivot assembly taken along line A-A in FIG. 2A, according to an embodiment of present invention.
Figure 2C:
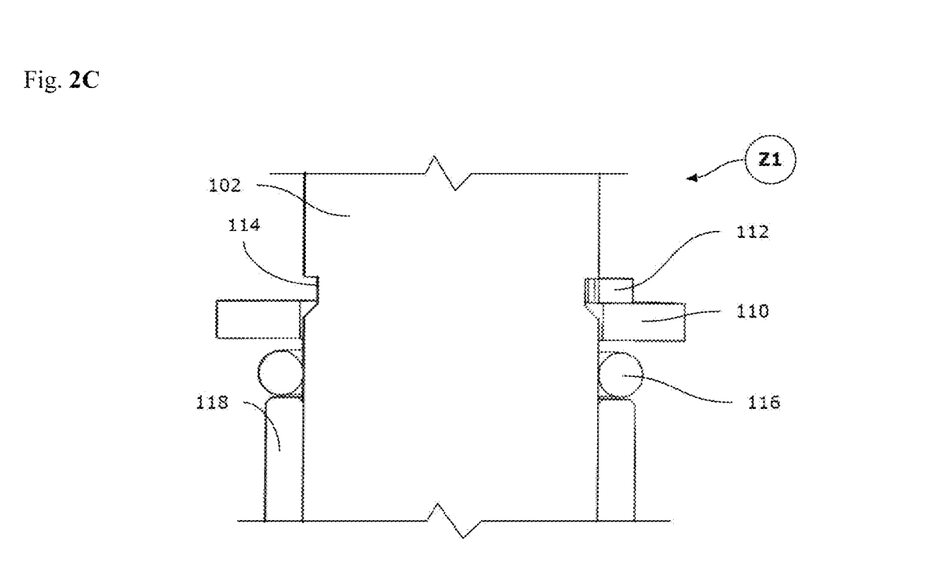
FIG. 2C illustrates an enlarged view of region 'Z1' of FIG. 2B, according to an embodiment of present invention.

FIGS. 2A and 2B illustrate a perspective view and a cross sectional view of the pivot assembly 100 without pivot housing 104 and cover 106. As shown, the pivot shaft 102 is coupled to one end of the lever 108 such that lever 108 can be actuated to rotate the pivot shaft 102 about the axis of the pivot shaft 102. Further, one or more bearings 118 may be provided on the portion of the pivot shaft 102 which is rotatably supported by the pivot housing 104. As illustrated in FIG. 2C, a washer 110 may be provided on the pivot shaft 102 such that the washer 110 rests on top edge of the pivot housing 104, in an assembled state. A circlip 112 is engaged in a circlip groove 114 formed on the pivot shaft 102, to restrict the upward movement of the washer 110. An O-ring 116 may be provided above top bearing 116 for sealing.

Figure 3A:
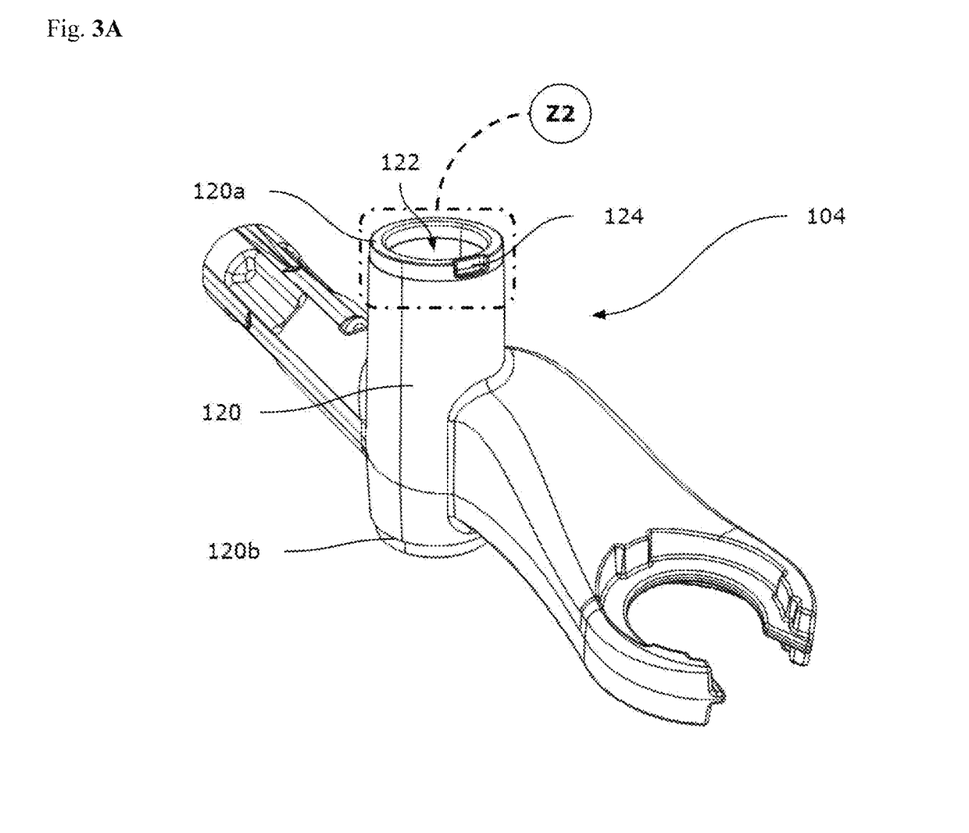
FIG. 3A illustrates a perspective view of the pivot housing, according to an embodiment of present invention.
Figure 3B:
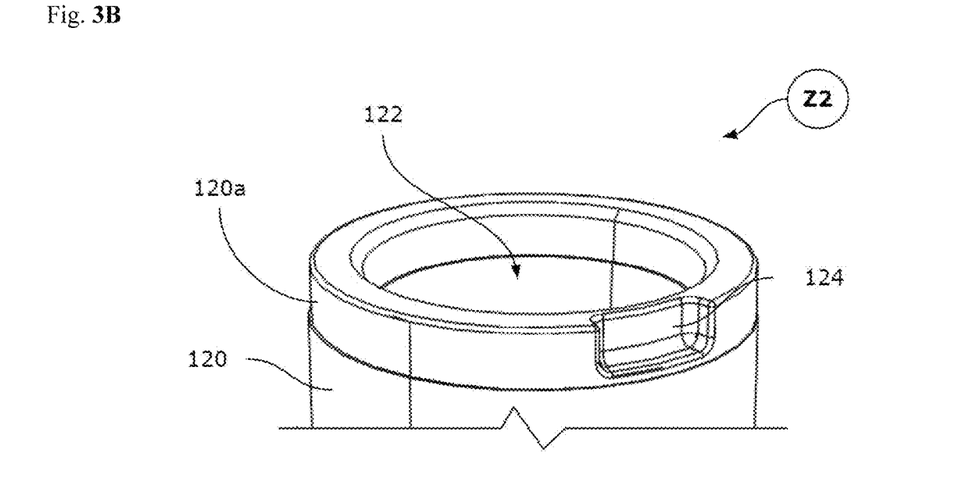
FIG. 3B illustrates an enlarged view of region 'Z2' of FIG. 3A, according to an embodiment of present invention.

As illustrated in FIG. 3A, the pivot housing 104 includes a housing body 120 having a top end 120*a* and a bottom end 120*b*. The housing body 120 further includes a central passage 122 to accommodate and rotatably support at least a portion of the pivot shaft 102. One or more bearings 118 may be provided in the central passage 122 at predefined locations. The cover 106 is intended to be locked at a top end 120*a* of the housing body 120 of the pivot housing 104. FIG. 3B illustrates an enlarged view of the top end 120*a* of the pivot housing 104. As shown, at least one recess 124 is formed at the top end 120*a* of the housing body 120 such that the recess 124 has open access at top edge and at outer surface of the top end 120*a*.

Figure 4A:
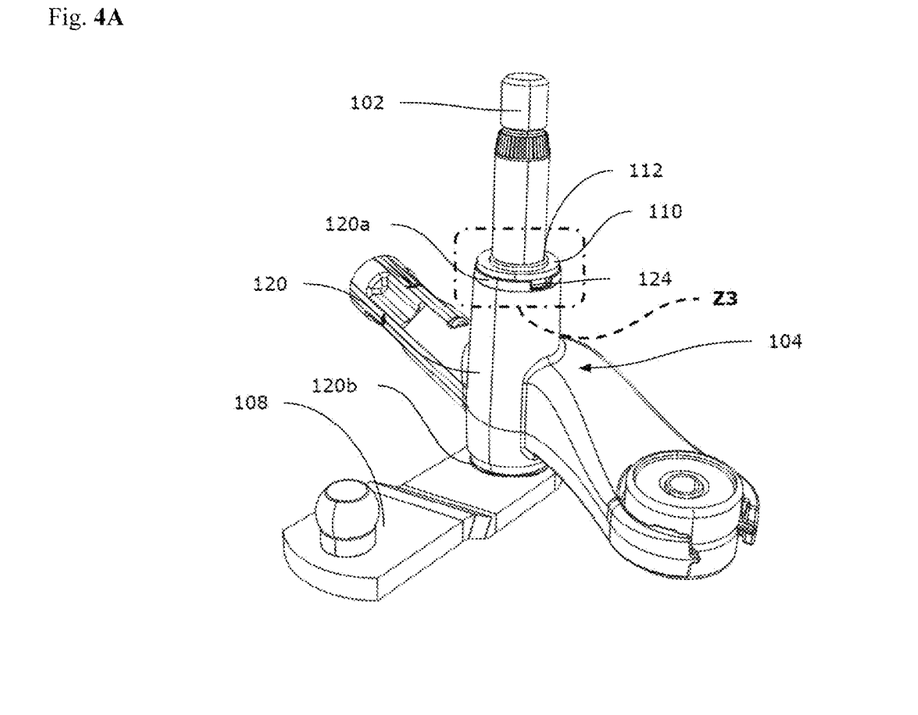
FIG. 4A illustrates a perspective view of pivot assembly by removing cover, according to an embodiment of present invention.
Figure 4B:
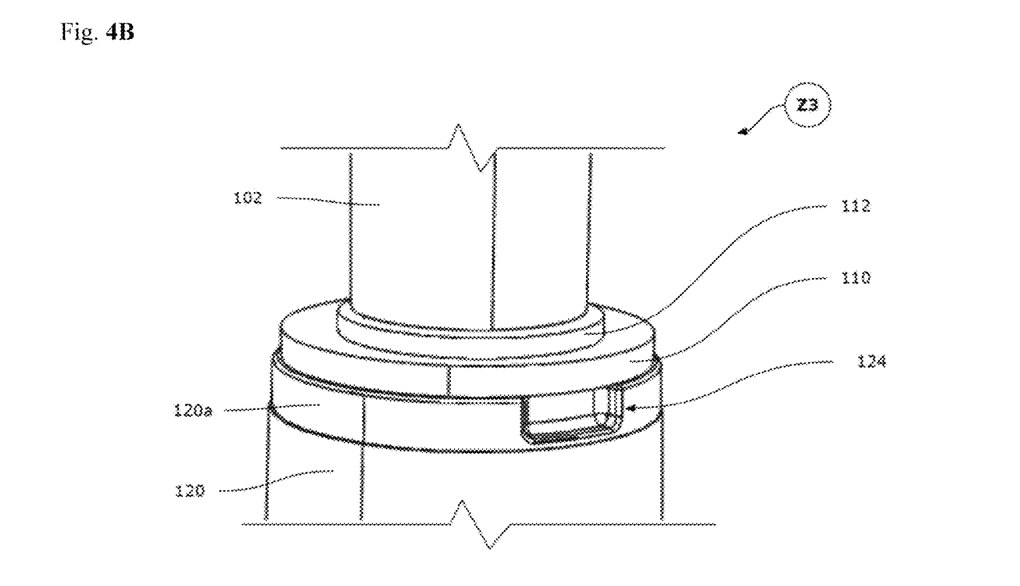
FIG. 4B illustrates an enlarged view of region 'Z3' of FIG. 4A, according to an embodiment of present invention.

FIG. 4A illustrates the pivot assembly 100 without the cover 106. As shown, the pivot shaft 102 is received in the central passage 122 of the pivot housing 104 and the lever 108 is coupled to the lower end of the pivot shaft 108 extending out from the bottom end 120*b* of the pivot housing 104. As illustrated in FIG. 4B, the washer 110 rests on top end 120*a* of the pivot housing 104 such that the opening of the recess 124 at top edge of the top end 120*a* is covered by the washer 110. Further, the circlip 112 is engaged in the circlip groove 114 such that the vertical movement of the washer 110 and the pivot housing 104 is restricted.

Now, the cover 106 is illustrated in FIGS. 5A, 5B, 5C, and 5D. The cover 106 includes a hollow tubular portion 126, a cylindrical step 128 formed at one end of the tubular portion 126 and a flange 130 formed at the free end of the cylindrical step 128. The diameter of the cylindrical step 128 is greater than the diameter of the tubular portion 126 and a transition portion 138 is integrally formed between the tubular portion 126 and the cylindrical step 128. The cylindrical step 128 further includes at least one cantilever snap 132 formed near inside wall of the cylindrical step 128. The cantilever snap 132 extends from the inner surface of the transition portion 138, parallel to the wall of the cylindrical step 128, and a locking profile 132*a* is formed at the free end of the cantilever snap 132. Moreover, a protrusion 136 is formed in the wall of the cylindrical step 128 adjacent to the cantilever snap 132, to provide a predefined clearance 140 between the cantilever snap 132 and the inner surface of the cylindrical step 128. This clearance 140 allows the cantilever snap 132 to bend outwards while locking the cover 106 on the pivot housing 104. Further, a plurality of continuous ribs 134 are formed on the inner surface of the transition portion 138 and inner surface of the cylindrical step 128. The rib 134 has a horizontal portion formed on the inner surface of the transition portion 138 and a vertical portion formed on the inner surface of the cylindrical step 128. When the cover 106 is locked on the pivot housing 104, the ribs 134 acts as a seating portion for the washer 110.

Figure 5A:
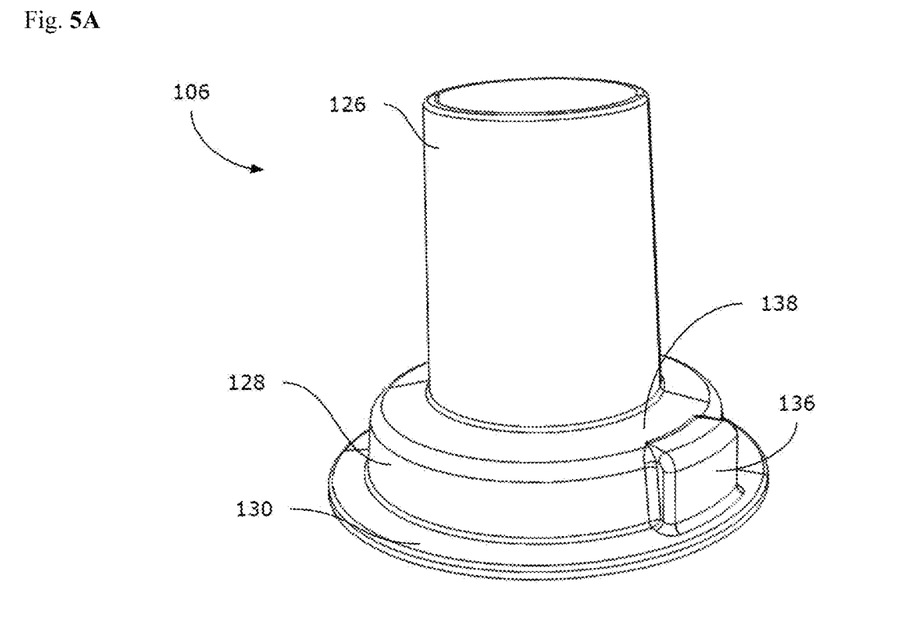
FIG. 5A illustrates a perspective view of cover, according to an embodiment of present invention.
Figure 5B:
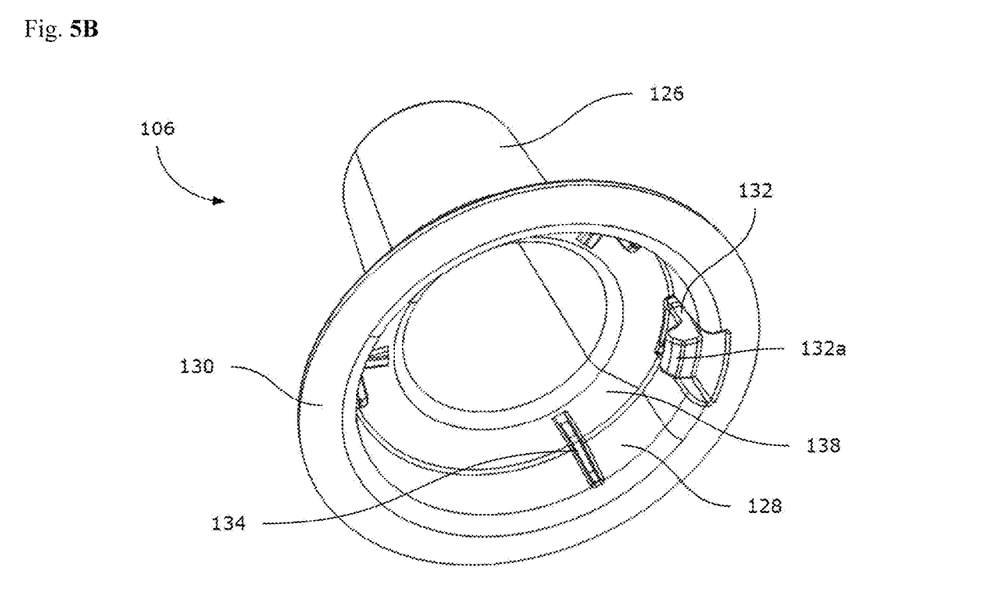
FIG. 5B illustrates a perspective view of cover from underneath, according to an embodiment of present invention.
Figure 5C:
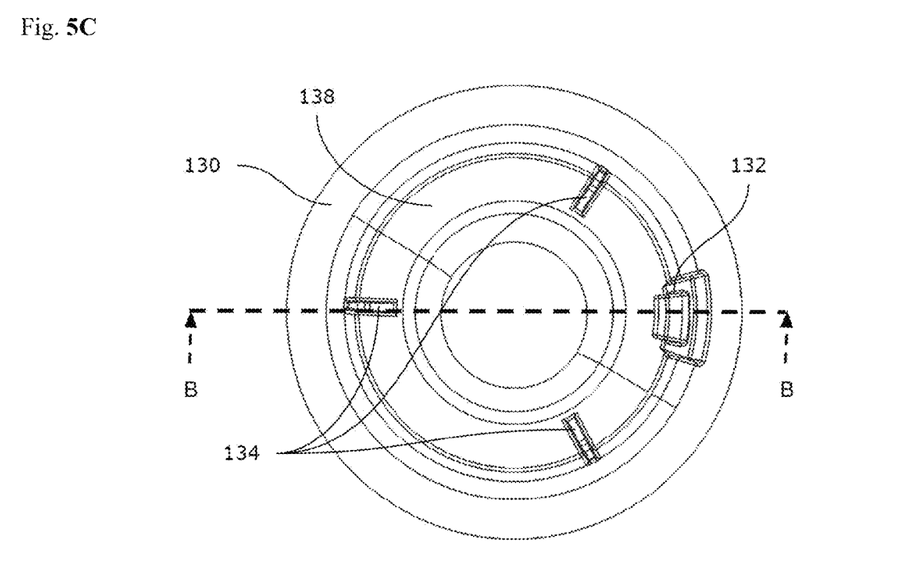
FIG. 5C illustrates a bottom view of cover, according to an embodiment of present invention.
Figure 5D:
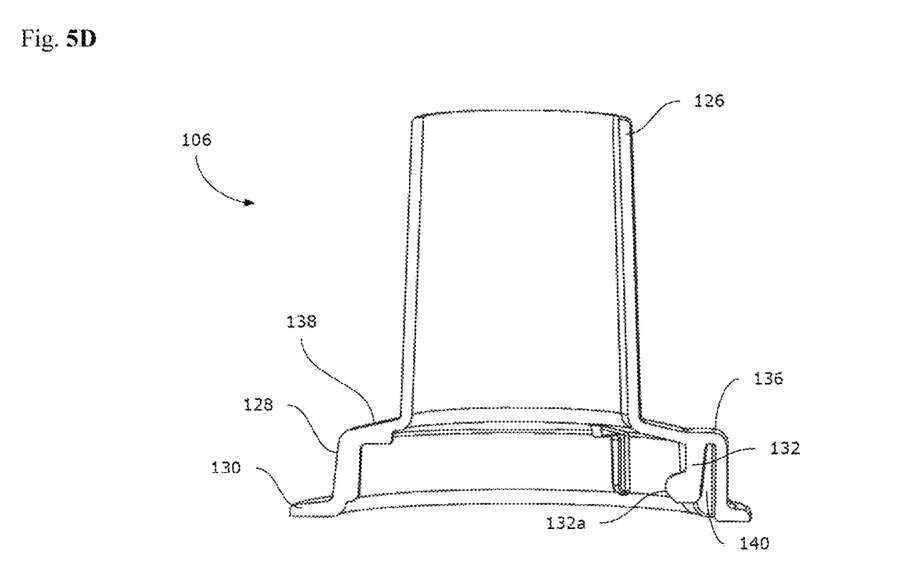
FIG. 5D illustrates a cross-sectional view of cover taken along line B-B in FIG. 5C, according to an embodiment of present invention.
Figure 5E:
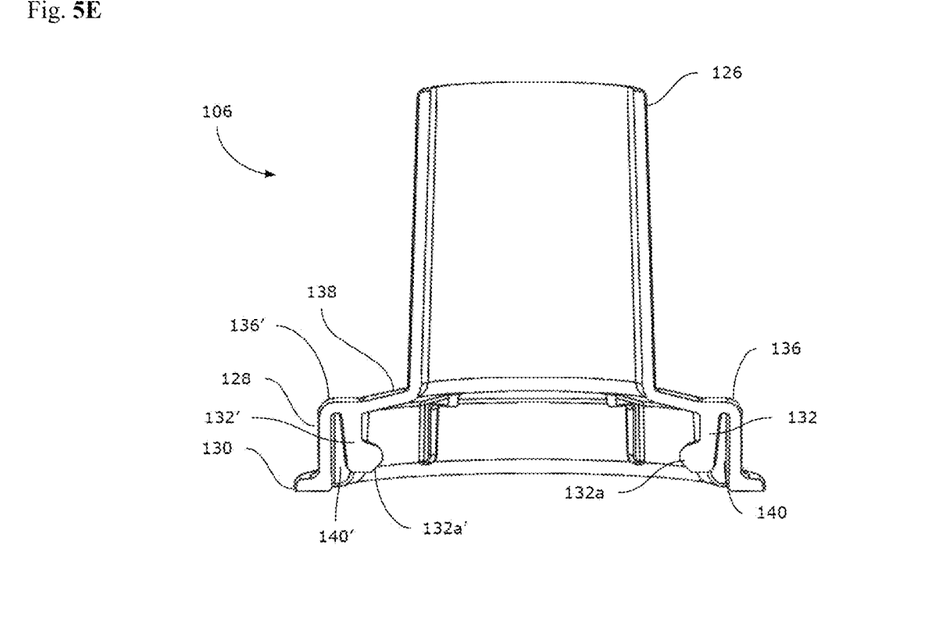
FIG. 5E illustrates a cross-sectional view of cover having two cantilever snaps, according to an embodiment of present invention.

In an alternate embodiment of the present invention, the cover 106 may include two or more cantilever snaps 132. FIG. 5E illustrates an exemplary embodiment of the cover 106 having two cantilever snaps 132, 132', extending from the inner surface of the transition portion 138, parallel to the wall of the cylindrical step 128. Further, locking profiles 132*a*, 132*a*' are formed at the free ends of the respective cantilever snaps 132, 132'. Moreover, two protrusions 136, 136' are formed in the wall of the cylindrical step 128 adjacent to the cantilever snaps 132, 132', to provide a predefined clearances 140, 140' between the cantilever snaps 132, 132' and the inner surface of the cylindrical step 128, respectively.

Figure 6A:
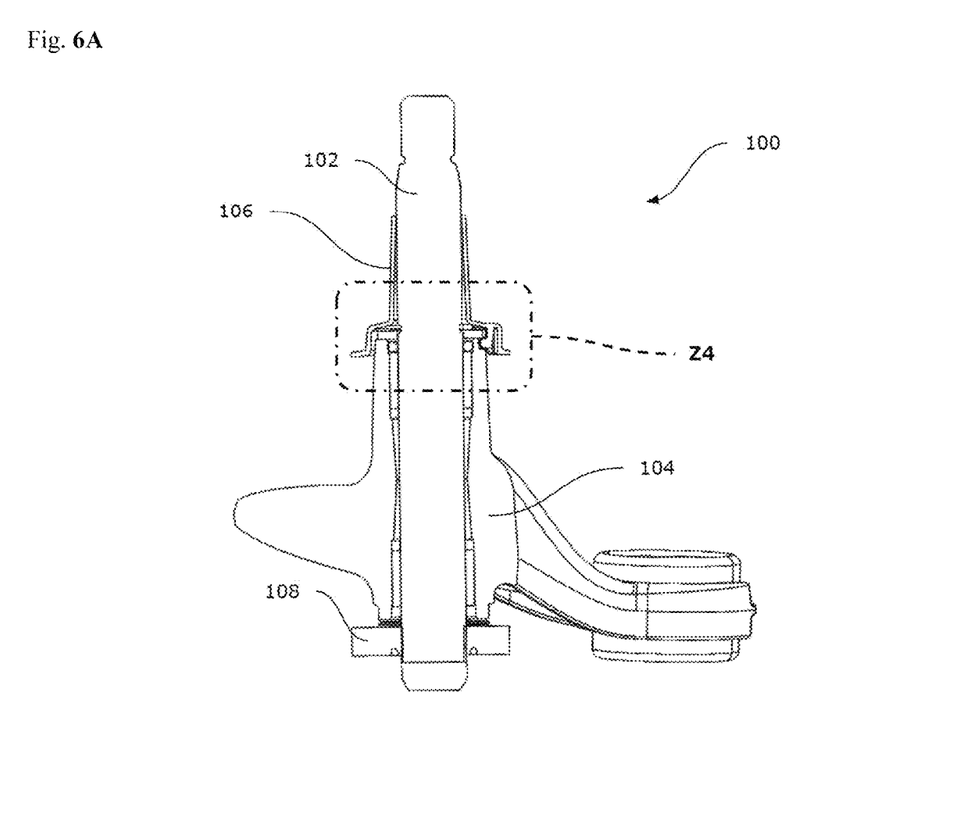
FIG. 6A illustrates a cross-sectional view of the pivot assembly taken along line C-C in FIG. 1, according to an embodiment of present invention.
Figure 6B:
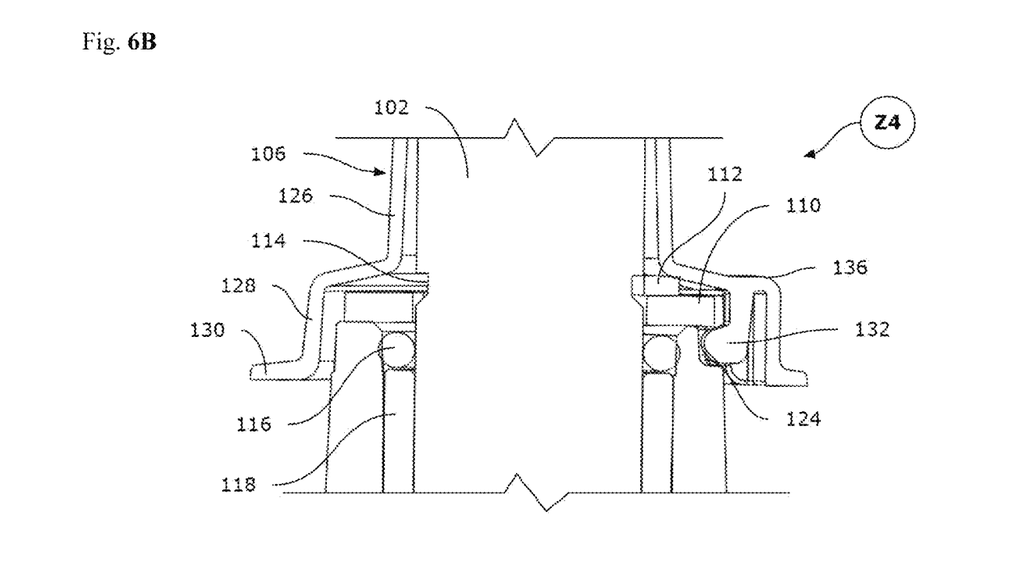
FIG. 6B illustrates an enlarged view of region 'Z4' of FIG. 6A, according to an embodiment of present invention.

As illustrated in FIGS. 6A and 6B, the cover 106 is sleeved over the pivot shaft 102 such that the cylindrical step 128 is oriented towards the pivot housing 104. The cover 106 is moved over the pivot shaft 102 towards the pivot housing 104 until the locking profile 132*a* of the cantilever snap 132 contacts the washer 110. The locking profile 132*a* has predefined tapered portions to gradually deform the snap 132 outwards upon application of the force on the cover 106. During further movement of the cover 106 towards the pivot housing 104, the cantilever snap 132 comes back to its neutral position from deformed position and thereby the locking profile 132*a* is received in the recess 124 of the housing body 120. In locked state, the washer 110 restricts upward movement of the cover 106 whereas the recess 124 restricts rotational movement of the cover 106 with respect to the pivot housing 104. In an assembled state, the cover 106 is fixed to the pivot housing 104 and the pivot shaft 102 is free to rotate with respect to the cover 106 and the pivot housing 104.

Figure 6C:
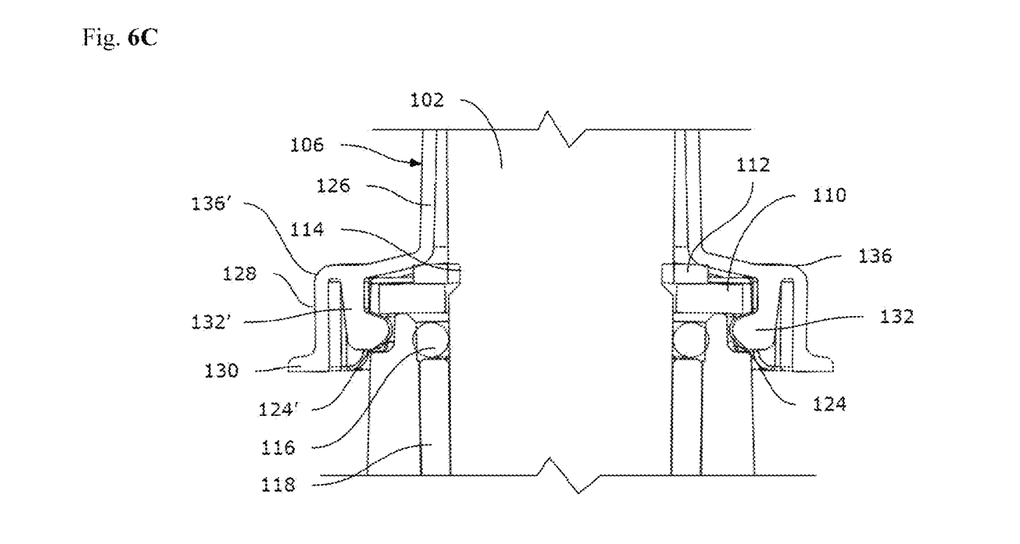
FIG. 6C illustrates an enlarged view of cross section of pivot assembly with cover having two cantilever snaps, according to an embodiment of present invention.

FIG. 6C illustrates an alternate embodiment of the present invention, wherein the cover 106 may be locked on the housing body 120 by two cantilever snaps 132, 132'. The cantilever snaps 132, 132' are received in the corresponding recesses 124, 124' provided at the top end 120*a* of the housing body 120.

In an embodiment of the present invention, the diameter of the tubular portion 126 of the cover 106 may increase from free end towards the transition portion 138.

In an embodiment of the present invention, a predefined clearance is provided between inner diameter of the tubular portion 126 and the outer diameter of the pivot shaft 102.

In a preferred embodiment of the present invention, the cover 106 is manufactured as a single part.

In a preferred embodiment of the present invention, the cover 106 is made from any suitable plastic material such as Polypropylene (PP).

In an alternate embodiment of the present invention, any other suitable material may be used for manufacturing the cover 106.

The invention shall not, however, be limited to the means and configurations described and illustrated herein, and shall also extend to any equivalent means or configuration described and illustrated herein, and to any technical combination operating such means.

LIST OF REFERENCE SIGNS

100 Pivot assembly
102 Pivot shaft

104 Pivot housing
106 Cover
108 Lever
110 Washer
112 Circlip
114 Circlip groove
116 O-ring
118 Bearings
120 Housing body
120a Top end of housing
120b Bottom end of housing
122 Central passage
124, 124' Recess
126 Tubular portion
128 Cylindrical step
130 Flange portion
132, 132' Cantilever snap
132a, 132a' Locking profile
134 Ribs
136, 136' Protrusion
138 Transition portion
140, 140' Clearance

The invention claimed is:

1. A cover for a pivot assembly of wiper system comprising:
   a tubular portion;
   a cylindrical step;
   a transition portion integrally formed between the tubular portion and the cylindrical step; and
   at least one cantilever snap configured to extend from inner surface of the transition portion, in longitudinal direction of the cover, with the cylindrical step including at least one protrusion extending radially outward that includes sidewalls and an end wall, formed at a location adjacent to the cantilever snap, to provide a predefined clearance between an inner surface of the cylindrical step and the cantilever snap.

2. The cover according to claim 1, wherein diameter of the cylindrical step is greater than the diameter of the tubular portion.

3. The cover according to claim 1, wherein the cantilever snap is configured with a locking profile formed at its free end.

4. The cover according to claim 1, wherein the tubular portion has conical shape with diameter decreasing towards its free end.

5. The cover according to claim 1, wherein two or more cantilever snaps are provided at predefined locations on the inner surface of the transition portion.

6. A wiper system for a motor vehicle comprising:
   a wiper arm;
   a pivot shaft configured to be coupled at one end of the wiper arm;
   a pivot housing configured to rotatably support at least a portion of the pivot shaft;
   a lever configured to be coupled at a lower end of the pivot shaft;
   a wiper motor configured to actuate the lever through mechanical linkages; and
   a cover configured to be received over a portion of the pivot shaft and locked on the pivot housing;
   wherein the cover comprises a tubular portion, a cylindrical step, and a transition portion integrally formed between the tubular portion and the cylindrical step,
   wherein the cover comprises at least one cantilever snap extending from inner surface of the transition portion, in longitudinal direction of the cover, with the cylindrical step including at least one protrusion extending radially outward that includes sidewalls and an end wall, formed at a location adjacent to the cantilever snap, to provide a predefined clearance between an inner surface of the cylindrical step and the cantilever snap,
   wherein the cantilever snap includes a locking profile configured to be received in a recess formed in a top end of the pivot housing.

* * * * *